United States Patent [19]
Sill

[11] 3,752,539
[45] Aug. 14, 1973

[54] REMOTELY OPERATED AIR BRAKE BLEEDING APPARATUS

[76] Inventor: Clark D. Sill, 217 N. Grand, Marshall, Mich. 49068

[22] Filed: July 3, 1972

[21] Appl. No.: 268,499

[52] U.S. Cl. .................................................. 303/68
[51] Int. Cl. ............................................. B60t 15/60
[58] Field of Search ..................... 303/1, 68, 69, 18, 303/71–74

[56] References Cited
UNITED STATES PATENTS

| | | | |
|---|---|---|---|
| 2,779,635 | 1/1957 | Wideman | 303/68 |
| 2,878,077 | 3/1959 | Thompson | 303/68 |
| 3,001,832 | 9/1961 | McClure et al. | 303/68 |

Primary Examiner—Duane A. Reger
Attorney—Roy A. Plant and Samuel Kurlandsky

[57] ABSTRACT

A remotely operated bleeding device for use with air brake systems provided on trains, and particularly for use with freight cars. the device comprises an air cylinder connected to the main brake air pressure pipe. The cylinder has a piston and piston rod, and a helical compression spring arranged to bias the piston toward the end of the cylinder at which air pressure is introduced. The spring and piston arrangement is such that application of air pressure to the air cylinder greater than about 20 psi compresses the spring and forces the piston to remain at the opposite side of the cylinder. The piston remains so during normal operation of the train and braking system. The piston rod is provided with a latch bar either connected thereto or intgral therewith, and a latch bar engaging member cooperating therewith, and operatively connected to the bleeder valve of the car. The slow release of air pressure causes the latch bar to engage the operating member and to bleed the brake cylinder. Means is provided for disabling the bleeder device when emergency braking is applied to the cars, or when the brake air line is broken as the result of an accident.

9 Claims, 7 Drawing Figures

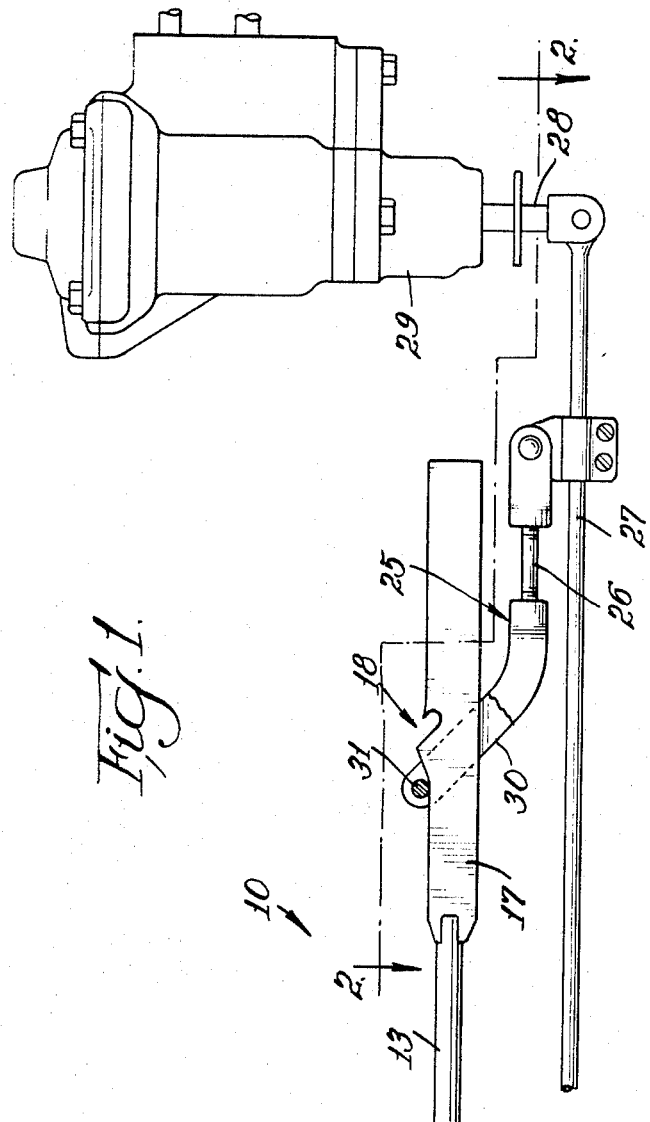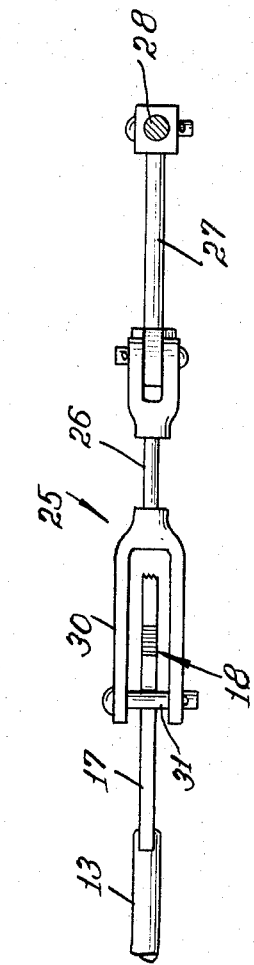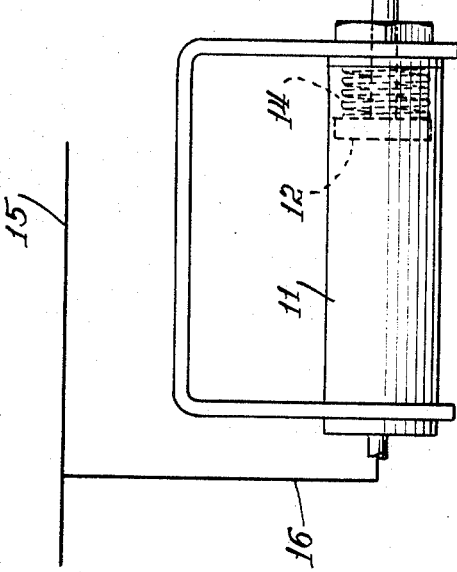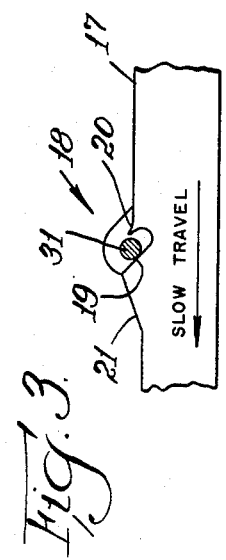

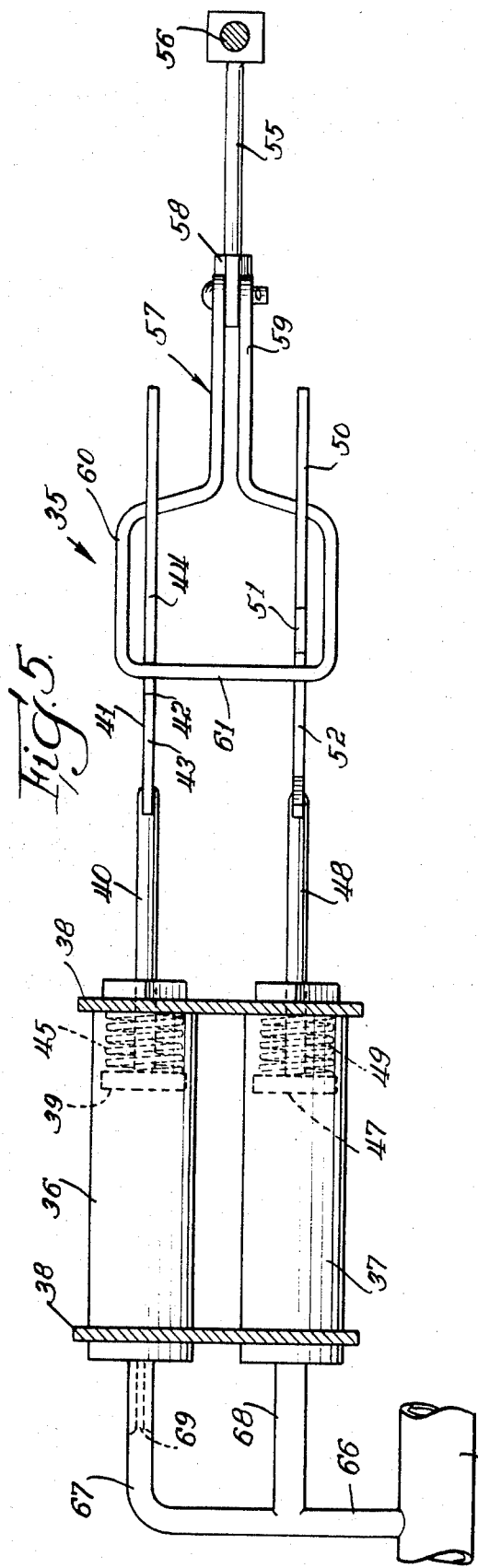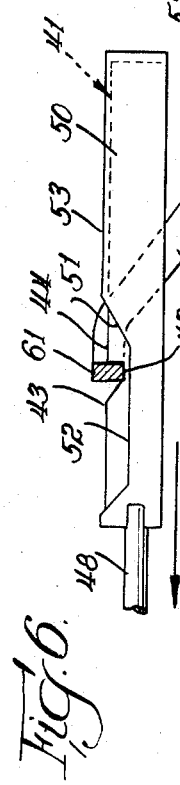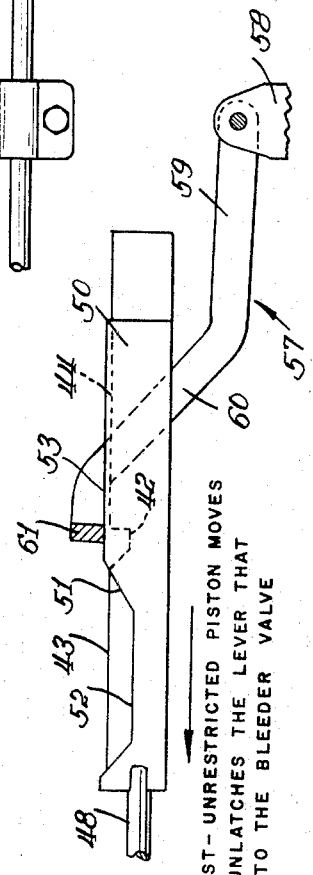

REMOTELY OPERATED AIR BRAKE BLEEDING APPARATUS

BACKGROUND OF THE INVENTION

The present invention deals broadly with air operated braking systems utilized in railroad cars, and more specifically is concerned with an air braking system having means provided for remotely bleeding the air brakes on each car by central control means provided in the locomotive.

Conventional air brake systems utilized on railroad trains have an air operated brake cylinder on each car which operates the brakes. An air reservoir is also provided on each car communicating with the brake cylinder through a car brake control valve. The control valve is connected to the main brake air line or pipe in which air pressure is maintained at a value of 75–80 psi during normal operation. When the brakes of each car are to be applied, the engineer operates a valve which temporarily reduces the air pressure in the entire line by an amount of from 7 to 25 psi. When braking action is discontinued, the pressure within the air line rises again to a value of 75–80 psi. In case of emergency the brake control can be opened so that the air pressure is reduced to 0 psi (in excess of atmospheric pressure), thereby applying full brakes. Moreover, if an accident should occur and the brake line between any two cars broken, the reduction of pressure to atmospheric causes an immediate full application of the brakes in every car.

When a train comprising a plurality of freight cars reaches a marshalling or classification yard, the cars are disconnected and the individual cars or groups of cars switched to various sidings. However, when a group of freight cars is disconnected from the main train or from the locomotive, the air line is opened, thereby setting the brakes of each car to full emergency condition. As a result, the cars cannot be moved until the air in the brake operating cylinders is bled off. This is provided by a bleeding valve mounted on each car and connected with the braking system, and arranged to be hand-actuated by means of a lever. This can be extremely time consuming and expensive when a large number of cars must be individually bled. It has been estimated that a period of thirty minutes is required for one brakeman to bleed sixty cars.

SUMMARY OF THE INVENTION

Accordingly, it is an object of the present invention to provide an apparatus for remote bleeding of the brake cylinders of each car.

It is a further object to provide an apparatus of the type described with which bleeding of the brake cylinders of all the cars may be accomplished by controls located in the locomotive.

It is still further an object to provide such an apparatus wherein automatic bleeding of the air brakes may be accomplished without disabling the automatic safety features of the braking system.

It is still further an object to provide an apparatus for automatically bleeding brake cylinders which is foolproof and safe to operate.

It is still further an object to provide an automatic bleeding apparatus which may be readily and inexpensively assembled, and which utilizes components which are not unduly expensive.

Still further objects and advantages of the invention will appear as the description proceeds.

To the accomplishment of the foregoing and related ends, the invention, then, consists of a remote bleeding apparatus for use with railroad air brakes, herein fully described and particularly pointed out in the claims, the annexed drawings, and the following description setting forth in detail certain illustrative embodiments of the invention, such disclosed embodiments illustrating, however, but several of the various ways in which the principle of the invention may be used.

BRIEF DESCRIPTION OF THE DRAWINGS

In the annexed drawings:

FIG. 1 is a side elevational view of the apparatus of the invention, diagrammatically illustrating the interconnection of some of the components.

FIG. 2 is a view of the apparatus of FIG. 1 taken at the line 2—2 of FIG. 1, looking in the direction of the arrows.

FIG. 3 is a fragmentary side elevational view showing the latching mechanism of the apparatus of FIG. 2, in one position.

FIG. 4 is an enlarged fragmentary view in side elevation showing the latching portion of the apparatus after fast travel.

FIG. 5 is a top view of another embodiment of the invention.

FIG. 6 is an enlarged fragmentary view in side elevation with the latching mechanism in one position, and FIG. 7 is a view similar to that of FIG. 6, but showing the latching mechanism in a different position.

DESCRIPTION OF THE SPECIFIC EMBODIMENTS

Referring more particularly to FIG. 1, the remote bleeding apparatus 10, according to the invention, is shown comprising an air cylinder 11 having a piston 12 slidably mounted therein and a piston rod 13 affixed to the piston 12. A helical compression spring 14 is mounted over the piston rod 13 and urges the piston 12 toward the end of the piston having a compressed air inlet (retracted position). Compressed air is supplied from the main brake pipe 15 which runs throughout the length of the train, by means of a connecting pipe 16.

A latch bar 17 is connected to the remote end of the piston rod 13. The latch bar 17 may be integral with the piston rod 13, affixed thereto as by welding or bolts, or alternatively hingedly or pivotally coupled thereto and independently supported. The latch bar 17 is provided with a latch notch 18 having an inclined ramp 19 at one side and a hook 20 at the other. A bar ramp 21 is provided at the end of the latch bar 17 connected to the piston rod 13. A latch bar engaging rod 25 is cooperatively arranged with the latch bar 17 and comprises a connecting rod 26 pivotally connected to the main bleeder control rod 27 of the freight car. The rod 27 is connected to the bleeder valve arm 28 of the bleeder valve 29.

The upper portion of the latch bar engaging rod 25 has bifurcated members 30 connected at their ends by a transverse notch engaging member 31.

In operation, air pressure in the amount of 75–80 psi is applied to the main brake pipe 15. Compressed air is consequently supplied through the connecting pipe 16 and into the chamber of the cylinder 11. The compression spring 14 and piston diameter are so designed that the spring biasing force can be overcome by an air pressure of at least 20 pounds applied to the chamber of the cylinder 11. Consequently, the piston is pushed forward to its farthermost position, as shown in FIG. 1. In this position the notch engaging member 31 lies on or below the ramp 21. The apparatus remains in this position through normal operation of the train, including normal braking operation, since during such normal operation and normal braking operation the air pressure in the main brake pipe 15 remains sufficiently high to retain the spring 14 in compressed condition.

When a train has arrived at the marshalling yard and it is desired to disconnect a group of freight cars in order to reclassify the cars by moving them into the proper sidings, the braking system is applied to stop the train. At this point the bleeding apparatus is still in the position shown in FIG. 1. The engineer then slowly moves the brake control to decrease the air pressure still further. When the pressure reaches a value below 20 pounds, the spring 14 retracts the piston 12 toward the other end of the cylinder 11. As the latch bar is slowly moved by the piston, the transverse engaging member 31 drops into the notch 18 where it is retained by the hook 20. The latch bar then draws the bleeder operating rod 25 with it, thereby moving the main bleeder control rod 27 and causing the air to be bled from all the brakes. Now when the cars are disconnected, the brakes will not be set, and the cars can be freely moved about. When the cars are recoupled to the train and the brake air pipes reconnected, the air pressure in the lines of each car is re-established at 75-80 psi. Consequently, the piston rod 13 is extended, causing the transverse notch engaging member 31 to ride up the ramp 19 and become disengaged from the notch 18 and hook 20 and to assume the normal position shown in FIG. 1.

When the train is traveling and the bleeding apparatus is in the normal operating condition shown in FIG. 1, should it become necessary to apply the brakes in full emergency service by causing the pressure in the main brake pipe 15 to be reduced substantially to atmospheric pressure, the spring 14 causes the piston 12 to retract rapidly to the other end of the cylinder. This causes the notch engaging member 31 to ride rapidly up the bar ramp 21 and to acquire an upward momentum. When the notch engaging member 31 descends, it will have cleared the notch 18 and hook 20 and will land on the upper edge of the latch bar beyond the notch 18, as shown in FIG. 3, thus disabling the bleeding apparatus. Thus, the bleeding apparatus does not interfere with emergency braking. The same is true in the case of an accident in which the main brake pipe 16 is disconnected at any point. As a result there is a rapid decrease in air pressure to atmospheric pressure, causing rapid movement of the piston 12 and latch bar 17, so that the notch engaging member 31 again rides up the ramp 21 and clears the notch 18 and is not engaged by the hook 20. The brakes in every car are consequently set to full emergency braking condition.

Referring to FIGS. 5-7, another embodiment of the invention is shown in which the bleeding apparatus 35 comprises a primary air cylinder 36 and a secondary air cylinder 37. The primary air cylinder 36 is mounted on a bracket 38 and includes a piston 39 affixed to a piston rod 40 and having a latch bar 41 connected to the remote end of the piston rod 40. The latch bar 41 may be integral with the piston rod 40, affixed thereto, or pivotally connected thereto. The latch bar 41 is provided with a notch or detent 42 having a bearing surface 43 on one side and a bearing surface 44 on the other. A helical compression spring 45 is mounted over the piston rod 40 and biases the piston 39 toward the fully retracted position. The spring should be so designed that it can be overcome and fully compressed when an air pressure of about twenty pounds is present in the main brake line, and additionally should be sufficiently strong that it can operate the bleeder apparatus.

The secondary air cylinder 37 is also supported by the bracket 38 and comprises a piston 47 having a piston rod 48. A helical compression spring 49 is mounted over the piston rod 48 biasing the piston 47 toward fully retracted position. The secondary cylinder should be so designed that the spring 49 is fully compressed when there is an air pressure of about 20 psi in the main brake line, but the spring need not be as strong as the spring 45, since the spring 49 does not operate the bleeder valve directly. An override bar 50 is connected to the outer end of the piston rod. The override bar 50 may be integral with the piston rod, affixed thereto, or pivotally connected thereto. The upper surface of the override bar 50 is contoured to provide a ramp 51, a lower surface 52, and an upper bearing surface 53.

The bleeder apparatus of the invention operates in conjunction with a conventional bleeder valve 54 which is conventionally operated by a main bleeder control rod 55 connected to a bleeder valve arm 56 of the bleeder valve 54. The remote bleeder operating apparatus of the invention also includes a latch bar engaging rod 57 connected by a coupling 58 at its lower portion 59 to the main bleeder control rod 55. The upper portion of the latch bar engaging rod 57 comprises a pair of bifurcated arms 60 connected together at their ends by a transverse engaging member 61.

Compressed air for operating the air cylinders is provided by the main brake air line 65 through a common supply pipe 66. A branch pipe 67 feeds the primary air cylinder 36 and a branch pipe 68 feeds the secondary air cylinder 37. The branch pipe 67 communicating with the primary air cylinder 36 is provided with a constriction orifice 69 so designed that when air pressure in the main brake line 65 is reduced rapidly as in emergency braking, the air from the primary air cylinder 36 is discharged more slowly than that from the secondary air cylinder 37. Alternatively, the constriction 69 may be provided in the form of an adjustable valve.

The operation of the embodiment of the invention shown in FIGS. 5–7 is somewhat similar to that of the embodiment shown in FIGS. 1–4. During normal braking operation, the air pressure in the main brake line remains above 20 psi. Consequently, the bleeder apparatus is immobile. When the train has stopped and it is desired to bleed the brakes, the engineer operates the braking control to slowly reduce the brake air line pressure to less than 20 pounds, preferably to atmospheric pressure. When the pressure reaches a value below 20 psi, the springs 45 and 49 slowly move the pistons 39 and 47 toward the retracted position. As the latch bar 41 is retracted, the notch 42 of the latch bar 41 engages the transverse engaging member 61 of the bleeder operating rod 57, causing the bleeder valve arm 56 to be moved laterally, thereby actuating the bleeder valve 54, and bleeding the brakes. The cars may be then disconnected and may be moved into the proper sidings without any further bleeding of their brakes. When the air lines of the disconnected cars are once again connected to the main air line of the train, the air pressure is built up to normal 75-80 psi in the main brake line, causing the springs 45 and 49 to be compressed and the bleeder valve disengaged. In the case of an emergency braking situation or in the case of an accident where the cars are uncoupled and the air line broken, it is necessary that the present bleeding device be disabled and full braking power applied without any bleeding of the brakes taking place. This is accomplished as follows. When the main air brake line is suddenly reduced to atmospheric pressure, the force of the springs 45 and 49 urge the pistons 39 and 47 to retract, thereby expelling the air from the respective cylinders. The presence of the constriction 69 causes the air to be expelled from the primary cylinder 36 more slowly than from the secondary cylinder 37. This causes the latch bar 41 to retract slowly. The secondary cylinder does not have a constriction and consequently the air is expelled from the cylinder rapidly. As a result the override bar 50 retracts rapidly. The ramp 51 engages the transverse engaging member, thereby lifting the transverse engaging member 61 out of the notch 42. As a result of this action, the bleeding device is disabled, permitting emergency braking power to be applied to the brakes.

The present remotely controlled bleeding system of the present invention has several advantages over conventional air braking systems. The primary advantage is that bleeding of all the cars may be simultaneously controlled by the engineer in the locomotive by the simple operation of stopping the train and then slowly placing the braking system in the full braking condition by reducing the brake air pressure to substantially atmospheric. The second advantage of the present system is that the remote bleeding function is accomplished without the loss of the emergency braking function. A further advantage is that the present system utiizes but a few relatively inexpensive parts. An additional important advantage is that the system is extremely reliable and safe to use.

While several embodiments of the invention have been shown and described, other equivalent forms will now be apparent to those skilled in the art. Therefore, the embodiments shown in the drawings are merely diagrammatic and for illustrative purposes, and are not intended to limit the spirit and scope of the invention as above described and illustrated in the drawings. It is further to be noted that while directional terms have been used, same are not to be construed as a limitation of the invention since such use has been availed of to better describe the invention in the various positions shown in the drawings.

The embodiments of the invention in which an exclusive property or privilege is claimed are defined as follows:

1. An apparatus for providing remotely controlled bleeding of the air brakes of a railroad car having a bleeder valve and actuating means therefor and adapted to be operated from a common brake air line, said apparatus comprising:
   a. an air-operated cylinder comprising:
      1. means defining a cylinder chamber adapted to be connected to said brake air line,
      2. a piston slidably mounted in said chamber,
      3. a piston rod affixed at one end to said piston and having a portion thereof extending out of said cylinder,
      4. spring means mounted in said cylinder chamber urging said piston in the direction for retracting said piston rod,
   b. latch means connected to the outer end of said piston rod,
   c. latch engaging means operatively associated with said latch means and adapted to be engaged thereby, and adapted to be operatively connected to said bleeder valve actuating means, and
   d. means adapted to disengage said latch engaging means from said latch means when said piston rod is rapidly retracted by the action of said spring means, whereby when air pressure in said brake air line is reduced slowly to a value permitting said piston rod to be slowly retracted by said spring means, said latch means engages said latch engaging means and actuates said bleeder valve thereby causing said brakes to be bled, and whereby when the pressure in said brake air line is rapidly reduced to atmospheric pressure, said disengaging means (d) disengages said latch engaging means (c) from said latch means (b) and prevents actuation of said bleeder valve.

2. An apparatus according to claim 1, wherein said latch means (b) comprises a latch bar having a notch provided at the upper edge thereof, and wherein said latch engaging means (c) has a transverse member adapted to be received and engaged within said notch.

3. An apparatus according to claim 2, wherein said disengaging means (d) comprises a ramp provided at the upper edge of said latch bar intermediate said notch and said piston rod and ascending toward the edge of said notch, whereby when the pressure in said brake air line is rapidly decreased to substantially atmospheric pressure, said transverse member rides up said ramp and clears said notch, thereby avoiding actuation of said bleeder valve.

4. An apparatus according to claim 1, wherein said air-operated cylinder and said spring means are so designed that said spring means is compressed when an air pressure greater than about 20 psi is present in said brake air line.

5. An apparatus according to claim 3, wherein the side wall of said notch adjacent said ramp is inclined, thereby permitting said transverse member to be disengaged from said notch.

6. An apparatus according to claim 2, wherein said disengaging means (d) comprises:
   1. a secondary air operated cylinder connected to said brake air line having a cylinder chamber with a piston disposed therein, a piston rod connected to said piston and spring means urging said piston in the direction in which said piston rod is retracted, and
   2. a release bar connected to said piston rod arranged, when said piston rod is retracted by said spring means, to lift said transverse member out of said notch, and means provided with said first-named cylinder to cause the piston thereof to be retracted more slowly than that of said secondary cylinder, whereby when the brake air line pressure is slowly reduced to substantially atmospheric pressure, said bleeder valve is actuated, and when said brake air line pressure is rapidly reduced to substantially atmospheric pressure, said secondary cylinder operates more rapidly than said first-named cylinder, thereby disengaging said transverse member from said notch and preventing actuation of said bleeder valve.

7. An apparatus according to claim 6, wherein said means for causing said first named cylinder to retract more slowly by the action of said spring means comprises an air supply pipe connected thereto having an inner bore with at least a portion thereof constricted to a smaller diameter than that of the air supply pipe to said secondary cylinder.

8. An apparatus according to claim 6, wherein said first-named and said secondary cylinder and the spring means therein are arranged so that said springs are compressed when the air pressure in said brake air line is at least about 20 psi.

9. An apparatus according to claim 6, wherein said release bar is provided with a ramp adapted to lift said transverse member out of said notch when said release bar is retracted by retraction of the piston rod to which it is connected.

* * * * *

PO-1050
(5/69)

UNITED STATES PATENT OFFICE
CERTIFICATE OF CORRECTION

Patent No. 3,752,539          Dated August 14, 1973

Inventor(s) Clark D. Sill

It is certified that error appears in the above-identified patent and that said Letters Patent are hereby corrected as shown below:

In the Abstract, Column 2, line 2, for "cars. the" read
-- cars. The --; line 13, correct the spelling of
"integral".
Column 5, line 38, correct the spelling of "utilizes".
Column 6, line 28, for "bc" read -- be --.

Signed and sealed this 12th day of March 1974.

(SEAL)
Attest:

EDWARD M. FLETCHER, JR.               C. MARSHALL DANN
Attesting Officer                     Commissioner of Patents